June 14, 1960     R. W. FISH     2,941,128
ELECTRIC CONTROL CIRCUIT
Filed Sept. 25, 1956

*INVENTOR.*
Richard W. Fish
BY P. J. Young, Jr.

United States Patent Office 2,941,128
Patented June 14, 1960

2,941,128

ELECTRIC CONTROL CIRCUIT

Richard W. Fish, Rochester, N.Y., assignor to Taylor Instrument Companies, Rochester, N.Y., a corporation of New York Filed Sept. 25, 1956, Ser. No. 612,026

14 Claims. (Cl. 317—149)

The present invention relates to control utilization of gas-filled tubes such as the thyratron. Such tubes are frequently utilized as switching devices, which, in turn are basic elements of control systems of the on-off or "Hi-Lo" type. Such control involves the control of some influence on a process by switch, the switch acting to permit the said influence to affect the process when the process is in a certain condition and to prevent the influence from affecting the process when the process is in another condition. For example, in controlling the transfer of heat to an object, it is desired to transfer heat to the process when the object is below a certain temperature, but not at other temperatures. If a mechanical contact device is used to turn the heat off and on, as needed, it is usual and desirable in certain cases to supplement the contact device with a relay through which the contact device controls the application of heat, and with a "hold-in device" that keeps the relay in heat supplying state at all times following the making of a contact that turns the heat on, until a contact is made which turns the heat off, even though there will be an intermediate stage in which neither contact is made. Such schemes which are well known in the art, requires that the relay include, as well as a contact device or analogous means controlling the application of heating energy, a further contact device, or analogous means controlling the aforesaid hold-in device.

The contact device initiating the control is ordinarily a low-current-carrying device of high contact resistance for reasons of safety and sensitivity, and ordinarily requires some intermediate device to transmit the control impulse to the final control element, for example, a relay controlling the supply of electrical current to a heater, the relay itself taking a larger current than can be conveniently handled by the control-initiating contact device.

In the past, it has been the practice to utilize a thyratron as an intermediate device between a low current contact device and a high current relay, because of the ability of the thyratron to pass large amounts of current between anode and cathode in response to small current changes in the grid circuit. I have devised a novel circuit arrangement utilizing a thyratron in such manner, which has the additional virtue of an inherent "hold-in" feature that does not require a set of hold-in contacts or the like on the relay. Other novel features relating to thyratron-type control circuits will appear hereinafter.

Figure 1:
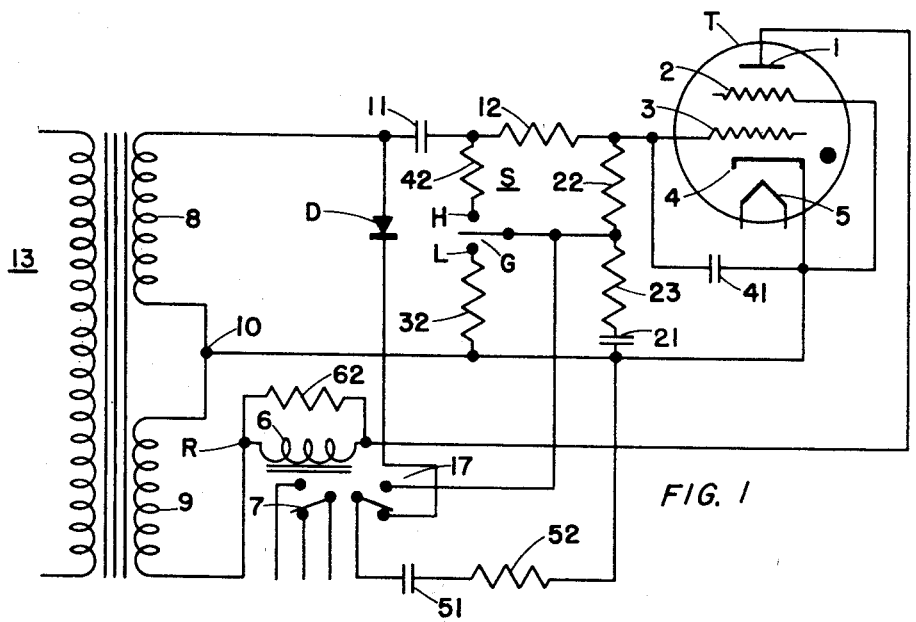
Fig. 1 shows the thyratron control circuit combined with a "Hi-Lo" contact device and a relay.

In Fig. 1, S is a contact device having a movable contact G arranged to make contact with fixed contacts H and L, T is a thyratron having an anode or plate 1, shield grid 2, control grid 3, cathode 4 and filament 5. As is well known, these tube elements are located in the relative positions shown in an envelope having a tenuous, ionizable, gaseous atmosphere sealed therein, the arrangement being such that as long as the control grid 3 is sufficiently negative with respect to the anode, essentially no current will flow in the tube between plate and cathwith respect to the anode, the gas in the tube between cathode and control grid), whereas if the anode is positively charged and the potential of the grid is raised past a certain point, i.e., becomes sufficiently less negative with respect to the anode, the gas in the tube between the electrodes will become ionized and a large current will flow in the anode circuit, until the anode circuit is broken, or until the anode becomes negatively charged for a sufficient time at which time if the control grid is made sufficiently more negative so as to suppress ionization, upon remaking of the anode circuit, or when the anode becomes positively charged, anode current will no longer flow. In no other way can the control grid 3 regain control of the tube. The foregoing is well understood in the art, and is often partially described succinctly as saying that the tube does not "fire" until the bias on the control grid is raised above the "cut-off" point, whereas if the "firing" of the tube is stopped somehow, and the the grid becomes biased below the cut-off point, i.e., the critical grid voltage for the particular anode voltage involved, the tube will not fire again.

As shown, a relay R has its operating coil 6 in the anode circuit which, when energized moves an actutor here shown as movable contact 7 to one position, and when de-energized permits the actuator to assume another position, which positions, for example, may be respectively on and off positions of a heating device, not shown. If desirable, a resistor 62 can be shunted across the coil 6 to smooth out the current in the anode circuit of the tube.

The power supply for relay and tube is a transformer 13 having two secondary windings 8 and 9, connected at a tap 10 common to both windings, and the usual primary winding connectible to an A.C. source.

Shield grid 2 and cathode 4 are connected to the tap 10, and the anode 1 is connected to the end of winding 9 via coil 6. Filament 5 may conveniently be connected across winding 8 and the end of winding 8 is connected via capacitor 11 and resistance 12 to control grid 3. Also connected to control grid 3 are capacitor 21, resistance 23 and resistance 22, capacitor 21 being connected to the common point, i.e., tap 10, of the said winding sections so that the E.M.F. of the winding section 8 divides between the two RC branches of a voltage divider defined by the described capacitors and resistors. The said branches are so proportioned relative to the E.M.F. of the winding section 8, that the rectified current between grid and cathode biases the control grid of the thyratron below cut-off for the particular anode voltage used on the tube.

Figure 2A:
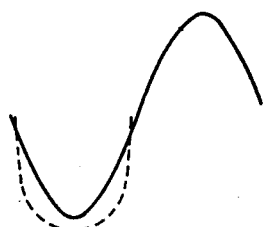
Figs. 2a, 2b, 2c, 2d, 2e, 2f and 2g are diagrams of grid voltage heavier useful in describing the operation of the circuit shown in Fig. 1.
Figure 2B:

The behavior of the circuit as so far outlined is as follows:

With the tube out of the circuit the instantaneous grid voltage available is as shown in solid line in Fig. 2a, zero being taken as the potential of the tap 10, and the critical grid voltage below which the tube will not fire being shown in dotted line. In Fig. 2b, capacitors 11 and 21 have been shorted out and the tube put in the circuit, but without anode voltage applied. As the figure shows, the tube could be fired, and the rectification between cathode and control grid has added a D.C. negative bias to the fluctuating grid voltage.

Figure 2C:
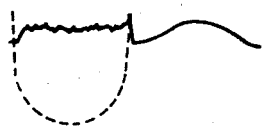

In Fig. 2c, anode voltage has been applied, with the resulting change in grid voltage wave form as the tube fires in the first half cycle.

Figure 2D:
Figure 2E:
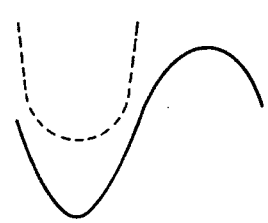

If, however, the tube is removed from the circuit or the anode circuit is disconnected, subsequent removal of the short from condenser 21, and then from condenser 11 will result in the respective wave-forms shown in Figures 2d and 2e, and if the tube is put in the circuit with anode voltage applied thereto, ionization will not occur and the tube will not fire. To cause the tube to fire, condenser 21 is shorted out by moving contact G to contact L, thus shorting resistance 32 across condenser 21 and resistor 23. When this happens, the charge is bled from condenser 21, and the D.C. current flowing between grid and cathode can no longer charge condensers 11 and 21 to a point where the negative swing of grid voltage can be depressed below the critical grid voltage. The tube will now fire when the anode voltage becomes positive, and a pulsating current will flow through the relay coil and operate movable contact 7 to turn on heat, or to exert some other control effect. If, however, contact G leaves contact L, thus unshorting condenser 21, but does not make with contact H, the tube will continue to fire, since ionization of the gas in the tube creates a low resistance path between cathode and control grid, which prevents build-up of charge on condenser 21 to a point to recreate sufficient negative D.C. bias on the grid to stop ionization on the half-cycle during which anode voltage is negative and the tube momentarily not firing. Thus, once ionized, upon shunting of capacitor 21 by resistor 32, the tube atmosphere stays ionized even though the shunt is removed, and the grid is therefore unable to regain control.

Figure 2F:
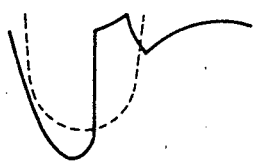
Figure 2G:
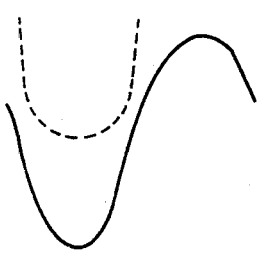

In order to cut the tube off, a shunt in the form of resistor 42 is provided which is shunted across resistors 12 and 22 when contact G makes contact H, and changes the relation of condenser 11 to the A.C. source, winding 8. Accordingly, completion of the shunt connection results in addition of negative bias to grid 3, and a shift in phase of instaneous grid voltage. The tube, of course, fires only on the positive half cycle of anode voltage, which latter normally coincides approximately with the negative half-cycle of grid voltage. The making of contact H, however, causes the waveform of instantaneous grid voltage to look something like Fig. 2f during the first cycle after making of contacts G and H. Thus, when the grid voltage goes into its negative swing it swings below where the critical grid voltage should be at this point (i.e., with regard to the phase shift relative to the anode swings), and the tube does not ionize to permit firing until the plate has gone through part of its positive swing. Accordingly, the time in which ionization occurs decreases, with the result that the effect of the ionization path on preventing a D.C. bias being built up by capacitors 11 and 21 diminishes, and the capacitors begin to build up bias on the grid. When this occurs, ionization time is cut further, and, after a few cycles, the instantaneous grid voltage is as shown in Figure 2g, entirely below the critical grid voltage. The tube now being quiescent, essentially no current flows in its anode circuit and the relay drops out.

If contact between contacts G and H is now broken, the bias on the grid returns to the state shown in Fig. 2e, and the tube remains quiescent.

Chattering of the relay R may result in the time between making of contacts G and L and complete ionization of the thyratron. Such chattering may be obviated by adding diode D, capacitor 51, resistance 52, connected as shown and a set of contacts 17 on the relay R arranged to connect the diode, capacitor and resistor across the winding 8 when the relay is de-energized by de-ionization of the thyratron, and to shunt the said resistor and capacitor across cathode and grid of the tube whenever the relay is energized. Therefore, if the relay energizes sufficiently to make contacts 17 following the making of contacts G and L, the charge on condenser 51 applies sufficient positive voltage to the control grid 3 to buck the aforementioned negative control grid 3 voltage thereby making the grid rapidly assume the potential as shown in Figure 2c, thus preventing relay R from chattering due to incomplete ionization of the tube caused by momentary contact between G and L and the finite time required for the negative grid voltage to rise above the critical grid voltage and assume the value as seen in Fig. 2c. The use of this feature is, however, not for the purpose of making the tube ionize or keep it ionized, but to accelerate the time required for complete ionization, which would occur anyway without the use of the diode and associated capacitor and resistor, where acceleration of ionization is desired.

While I have shown a thyratron of the tetrode type, a triode type (i.e., without a shield grid) could also be utilized. However, it would have to be a negative-grid type capable of tolerating high impedance in the grid circuit.

Should high frequency oscillations or "noise" cause firing of the tube when firing is not wanted, these can be suppressed by connecting a small condenser 41 across grid and cathode.

The circuit of the invention has been shown with certain resistors and capacitors in specific circuit relation to each other and to the other elements of the circuit, but it must be pointed out that the particular values used depend on the requirements of the particular tube to be used in the first instance, and on such incidental matters as contact resistance (shown as resistors 32 and 42) in the contact device S, and so on. Therefore, the presence or absence of the resistors and capacitors at the places shown in Fig. 1, and the actual values thereof as well, will depend on what one skilled in the art has to work with in the way of components. For example, capacitor 21 could be connected directly to resistor 22, and resistor 23 eliminated. Naturally, variation in part values, and/or variation in the number of impedance values, must retain the described charging and phase shifting effects ascribed to the capactive characteristics of the RC network, as well as the voltage-dividing character thereof. This follows necessarily from the fact that given a particular tube and a particular transformer of specified nominal voltage ratings at its secondary taps, the RC network must be proportioned so that the D.C. charging current due to the diode action modifies the voltage supplied to the RC network by the transformer to a sufficient extent to bias the control grid voltage swing of the tube below the critical values to keep the tube from firing, unless the contribution of the diode current to the control grid voltage is suppressed on positive swings of anode voltage to levels high enough to cause ionization of the tube as the grid-voltage swings negative without the benefit of the diode-current contribution. These matters are in the province of routine design and I have disclosed sufficient of the principles of my invention to enable one skilled in the art to work out necessary values in given cases without difficulty or exercise of invention. Nevertheless, for purposes of illustration I append hereto the following specification of specific values and identities of components that have been found to function as described above when arranged and manipulated in the circuit of Fig. 1:

| | |
|---|---|
| Thyratron | 2D21 or 5727. |
| Winding 8 | 6.3 volt winding. |
| Winding 9 | 120 volt winding. |
| Diode D | 1N51 or 1N63. |
| Capacitor 11 | 0.02 mfd. |
| Capacitor 21 | 0.1 mfd. |
| Capacitor 41 | 0.001 mfd. |
| Capacitor 51 | 0.1 mfd. |
| Resistor 12 | 2.2 meg. |
| Resistor 22 | 0.47 meg. |
| Resistor 23 | 0.47 meg. |
| Resistors 32, 42 | Contact resistance (50K for example). |
| Resistor 52 | 100K. |
| Resistor 62 | 2.5K. |

I claim:
1. A circuit including a thyratron, a first A.C. source across the anode and cathode of said thyratron, a second A.C. source of the same frequency as the first across the control grid and the cathode of the thyratron, said sources being out of phase with each other the magnitude of the E.M.F. of the second source of itself being insufficient to bias the grid so as to permit ionization of said thyratron, and the magnitude of the E.M.F. of said first source being such that at some time during positive anode swing said thyratron would fire, were the said E.M.F. of said second source the only bias on the said grid, a first condenser connected across the cathode and said grid to cause the voltage of the said second A.C. source to swing about a negative D.C. bias due to charging of said condenser from rectified current between said grid and cathode, the condenser being of sufficient magnitude to add a D.C. bias of sufficient extent to cause the net negative bias on said grid to fall below the cut-off point for said thyratron, whereby if the condenser is shorted out to drain off the charge on said condenser, said thyratron not having been fired, said thyratron will fire and the D.C. component of the bias on said grid will disappear, and circuit means operable at times to be connected across said condenser, said circuit means being constructed so as to effectively short said condenser when connected thereacross, whereby when said thyratron is connected in circuit as aforesaid and said circuit means is not connected across said condenser, said thyratron does not fire, whereas if said circuit means is then connected across said condenser, said thyratron will fire, and will continue firing even if said condenser is substantially unshorted.

2. The circuit as defined in claim 1, wherein the thyratron includes a shield grid between control grid and cathode, said shield grid being biased to the same potential as the cathode.

3. The circuit defined in claim 1 including positive bias means adapted to nullify negative bias on said grid in response to incomplete ionization of said thyratron upon a shunting of said condenser by said control means.

4. The circuit of claim 1 wherein the first and second A.C. sources consist of two transformer windings, and one end of each winding is connected to a common point to have the same potential, to which point is connected the said first condenser and said cathode.

5. The circuit as defined in claim 1, including a first resistor and a second condenser connected between the control grid of the thyratron and the said second source in voltage-dividing relation with the said first condenser and said second source, a second resistor adapted to be shunted across said first resistor, the values of said condenser and resistors being such that, with the said first condener in unshunted condition, shunting of the second resistor across said first resistor shifts the phase of the net negative bias voltage supplied the said control grid from the said second source, and increases the net negative bias, to such extent that the firing phase of the anode voltage exists for less time than is sufficient to permit the charge on the first and second condensers to drain off sufficiently between times of firing and times in which the negative grid voltage swing is far enough to prevent ionization, whereby eventually sufficient negative bias develops on said grid to bias said thyratron to cut-off throughout the positive swing of said anode, whereby if the said first resistor is then unshunted, said thyratron does not fire unless the first condenser is shunted again.

6. The circuit as defined in claim 1, including a second condenser connected in series between the control grid of the thyratron and the said second source in voltage-dividing relation with the said first condenser and said second source, impedance means includable in the grid circuit and adapted when included in the grid circuit to increase the negativeness of and shift the phase of the voltage supplied to the grid via said second condenser, the value of said impedance means being such that, with the said first condenser in un-shunted condition and said thyratron firing, inclusion of said impedance means in the grid circuit shifts the phase of the net negative bias voltage supplied the said control grid from the said second source, and increases the net negative bias, to such extent that the firing phase of the anode voltage exists for less time than is sufficient to permit the charge on the first and second condensers to drain off sufficiently between times of firing and times in which the negative grid voltage swing is far enough to prevent ionization, whereby eventually sufficient negative bias develops on said grid to bias said thyratron to cut-off throughout the cycle of anode swing, whereby if the said impedance means is then removed from said grid circuit, said thyratron does not fire unless the said first condenser is shunted again.

7. The circuit of claim 6, including positive bias supplying means comprising a positive terminal adapted for connection to said grid, means responsive to firing of said thyratron to connect said positive terminal to the said control grid so as to substantially nullify negative bias of the said control grid sufficient to cause the tube to fire fully, whereby to positively reinforce thyratron ionizing action begun by shorting said first condenser.

8. The circuit of claim 7 wherein means is connected in the anode circuit of said thyratron responsive to incomplete ionization of said thyratron to apply the said further bias voltage to the said control grid.

9. The circuit defined in claim 6, including a plural position switching means, which in one position, shunts said first condenser, and in the other position, unshunts said first condenser and includes said impedance means in circuit between said second condenser and said control grid.

10. The circuit defined in claim 6 wherein each condenser is connected in series with its own individual resistor, and the said first capacitor is adapted to be shunted through a further resistor.

11. The invention as defined in claim 6 including a shield grid between the said control grid and said cathode, and connected to the cathode.

12. The circuit of claim 6 including a relay having an operating coil in the connection between the thyratron anode and the first voltage source, whereby the relay is energized when the thyratron fires.

13. A circuit including a thyratron, current-supplying means to swing the control grid thereof alternately positive and negative, means to swing the anode thereof alternately positive and negative at the same frequency of alternation of grid swing but out of phase therewith, the negative swing of said grid being insufficient by itself to bias the thyratron below its cut-off point, capacitive means responsive to rectified current between cathode and control grid to increase the negative bias on the control grid to an extent sufficient to prevent said thyratron from firing, the swing of said control grid being sufficiently large to cause said thyratron to fire but for the negative bias increase due to said capacitive means, and control means operable at times to nullify increase in said negative bias by said capacitive means, whereby to permit firing of said thyratron.

14. The invention of claim 13 wherein a further capacitive means is provided, said further capacitive means being connected between one side of said current supplying means and said control grid, and the first-mentioned capacitive means being connected across said current supplying means and across said grid and cathode, impedance means connected between said further capacitive means and said grid, whereby the negative bias on said control grid depends on the electrical characteristics of said current supplying means as modified by both said capacitive means and said impedance means, said control means being actuable when said thyratron is firing to decrease the impedance of said impedance means and shift the phase relationship between said control grid swing and said anode swing in a direction decreasing the firing time of said thyratron in each cycle following actuation of said control means, said control means being arranged so that when actuated to decrease said impedance it is ineffective to prevent the first capacitive means from increasing negative bias on said control grid.

References Cited in the file of this patent

UNITED STATES PATENTS

| | | |
|---|---|---|
| 2,421,991 | Carriere | June 10, 1947 |
| 2,454,168 | Hartwig | Nov. 16, 1948 |
| 2,538,952 | Yates et al. | Jan. 23, 1951 |